United States Patent [19]

Boughton

[11] Patent Number: 4,617,100
[45] Date of Patent: Oct. 14, 1986

[54] NON-CONDUCTIVE PLUGGER FOOT
[75] Inventor: Michael J. Boughton, Newburgh, Ind.
[73] Assignee: Aluminum Company of America, Pittsburgh, Pa.
[21] Appl. No.: 784,725
[22] Filed: Oct. 7, 1985
[51] Int. Cl.[4] .......................... C25C 3/14; C21B 7/12; C21C 5/42
[52] U.S. Cl. .................................... 204/245; 204/279; 266/45; 266/236
[58] Field of Search ............... 204/245, 279; 266/236, 266/271, 195, 45; 175/19, 22

[56] References Cited

U.S. PATENT DOCUMENTS

| | | | |
|---|---|---|---|
| 1,572,253 | 2/1926 | Tilson | 204/245 X |
| 2,826,793 | 3/1958 | Flickinger, Sr. et al. | 266/236 X |
| 3,681,229 | 8/1972 | Lowe | 204/243 |
| 4,049,529 | 9/1977 | Golla | 204/246 |
| 4,230,308 | 10/1980 | Gueguen | 266/236 X |
| 4,328,085 | 5/1982 | Friedli et al. | 204/245 |
| 4,471,950 | 9/1984 | La Bate | 266/45 X |

FOREIGN PATENT DOCUMENTS

| | | | |
|---|---|---|---|
| 800598 | 12/1968 | Canada | 204/135 |
| 1022497 | 12/1977 | Canada | 204/203 |
| 1262069 | 2/1972 | United Kingdom . | |

Primary Examiner—Donald R. Valentine
Attorney, Agent, or Firm—Thomas J. Connelly

[57] ABSTRACT

A non-conductive plugger foot is disclosed for breaking through a solidified crust of electrolyte on an electrolytic reduction cell. The plugger foot includes a cylindrical sleeve having at least one downwardly depending leg attached thereto. The opposite end of the sleeve is connected to a vertically movable rod attached to a fluid or air actuated apparatus. A hollow cylindrical shell, which is closed at one end, is designed to receive the sleeve in its opposite end. The sleeve is inserted into the shell such that the leg is completely enclosed therein. The shell is then filled with a heat resistant, non-conductive refractory material which forms a permanent bond between the sleeve, the leg and the shell.

19 Claims, 3 Drawing Figures

NON-CONDUCTIVE PLUGGER FOOT

FIELD OF THE INVENTION

This invention relates to a non-conductive plugger foot for an electrolytic reduction cell which prevents current flow from a molten electrolytic to the mechanical feeder assembly.

BACKGROUND OF THE INVENTION

In the making of aluminum in an electric reduction cell, it is normal to employ a crustbreaker or plugger foot which serves the purpose of breaking through a solidified crust on top of the molten bath. After a hole has been punched through the crust, additional alumina can be added to the bath so as to mix with the molten cryolite to form aluminum. The use of a crustbreaker or a plugger foot is known in the art as taught by U.S. Pat. No. 4,049,529 and British Pat. No. 1,262,069. It is also common to attach the plugger foot directly to the mechanical ore feeder as is shown in U.S. Pat. No. 3,681,229, Canadian Pat. No. 800,598 and Canadian Pat. No. 1,022,497. The typical plugger foot is a solid cast iron or steel projectile attached to the end of a vertically mounted steel rod. This design is very simple in construction, inexpensive and easy to manufacture. However, the drawback of the present plugger foot occurs when the cell or pot goes into an "anode effect". An anode effect occurs when the alumina ore within the molten bath decreases in percentage compared to the molten cryolite. This occurs as the electrolysis process takes place and the alumina is chemically used up. With less alumina in the bath, the voltage spikes from about 5 volts per cell to about 30 volts per cell. The easiest way to bring the voltage back to the normal level is to add more alumina to the bath. However, as the plugger foot punches a hole through the crust so that more alumina can be added, the higher voltage level transmitted from the bath through the metal plugger foot up into the feeder mechanism and causes arcing across various seals and pitting of various metal surfaces. This is detrimental to the feeder mechanism and air cylinder and necessitates replacement of the damaged components. Such replacement is both expensive and time-consuming.

Now a non-conductive plugger foot has been invented which prevents the transfer of electrical voltage from the molten bath to the feeder mechanism.

SUMMARY OF THE INVENTION

Briefly, the present invention relates to a non-conductive plugger foot for breaking through a solidified crust of electrolyte on an electrolytic reduction cell. The plugger foot includes a cylindrical sleeve having at least one downwardly depending leg attached to an end thereof. The sleeve is connected at an opposite end to a rod projecting downwardly from an air actuated apparatus. A hollow cylindrical shell, which is closed at one end, receives the sleeve in the opposite end such that the leg is completely enclosed within the shell. The shell is then filled with a heat resistant, non-conductive refractory material which forms a permanent bond between the sleeve, leg and shell. The refractory material has an electrical resistance of at least 100,000 ohms.

The general object of this invention is to provide a non-conductive plugger foot. A more specific object of this invention is to provide a non-conductive plugger foot for breaking through a solidified crust on an alumina reduction cell.

Another object of this invention is to provide an inexpensive non-conductive plugger foot.

Still another object of this invention is to provide a non-conductive plugger foot which can easily be retrofitted onto existing equipment.

A further object of this invention is to provide a non-conductive plugger foot which is capable of withstanding compressive stresses for a longer period of time than conventional cast iron or steel plugger foots.

Other objects and advantages of the present invention will become more apparent to those skilled in the art in view of the following description and the accompanying drawings.

DESCRIPTION OF THE PREFERRED EMBODIMENT

Figure 1:
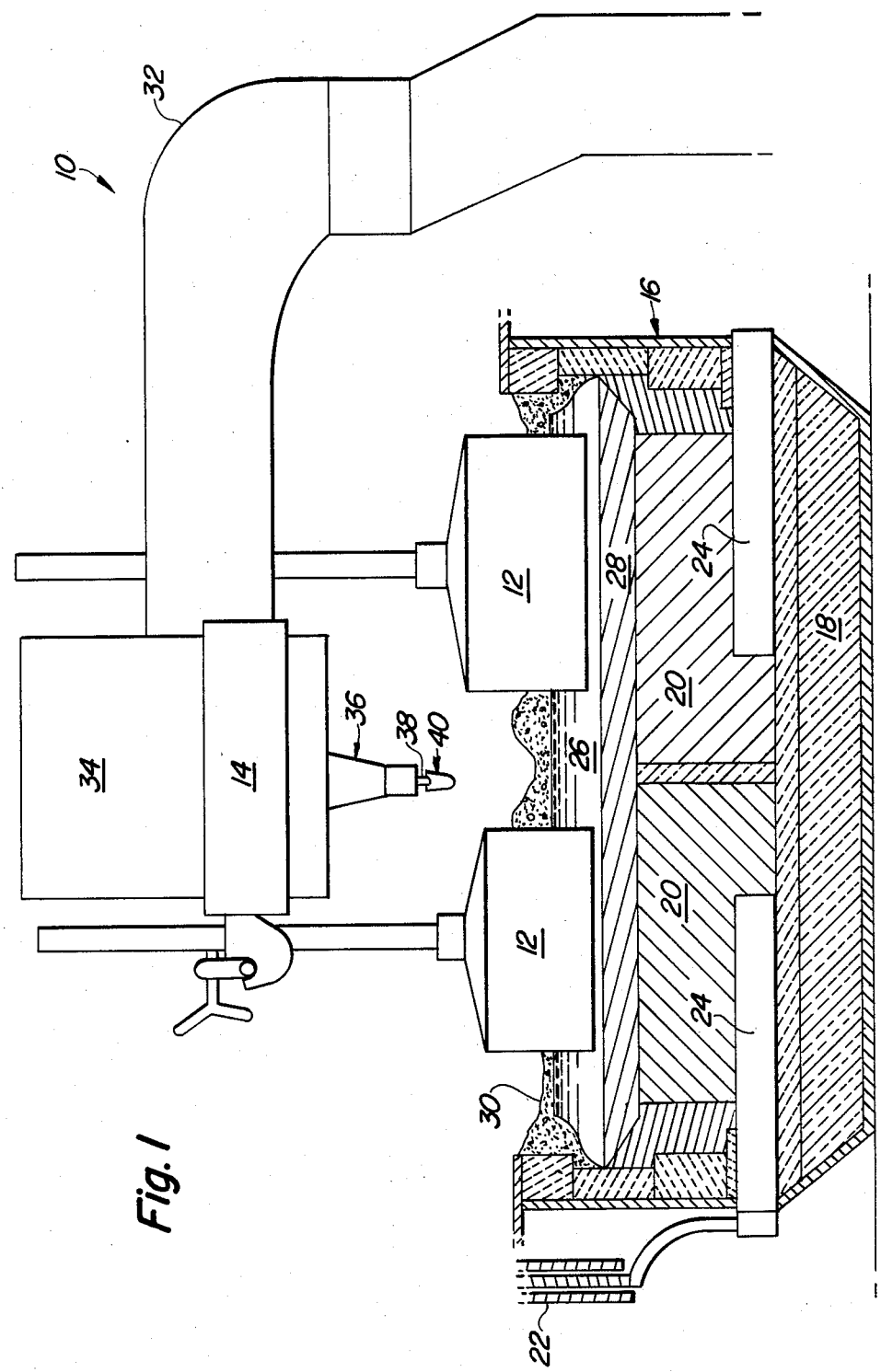
FIG. 1 is a vertical section of an electrolytic reduction cell equipped with a non-conductive plugger foot.

An electrolytic reduction cell 10, such as those used in the production of aluminum, is shown having a pair of pre-baked carbon anodes 12 suspended in a spaced apart manner from a movable bridge 14. The anodes are suspended above a pot or cell 16 which is lined with a layer of insulating material 18 upon which blocks of solid carbon cathode 20 are positioned. The cathode blocks 20 are connected in an electrical circuit with a ring bus 22 via collector bars 24 that pass through the cathode blocks 20.

A bath of molten cryolite and alumina is maintained at approximately 950°–960° C. within the pot 16 and as reduction takes place a layer of molten aluminum 28 settles out at the bottom. A sintered aluminum crust 30 forms above the bath and surrounds the pre-baked carbon anodes 12 which extend into the bath 26. The crust 30 may build up to have a thickness of several inches.

The movable bridge 14 is vertically adjustable relative to a fixed bridge (not shown) to enable the carbon anodes 12 to be adjusted relative to the height of the bath 26. The movable bridge 14 is connected to a low-voltage, high-current capacity riser bus 32 which in turn is connected in series to adjacent cells (not shown). The riser bus 32 is connected to a direct current source.

An overhead hopper 34 is supported between the carbon anodes 12 and is filled with alumina ore. The alumina ore is added as needed through a feeder mechanism 36. The feeder mechanism 36 has a downwardly projecting steel rod 38 attached thereto which supports a non-conductive plugger foot 40.

Figure 2:
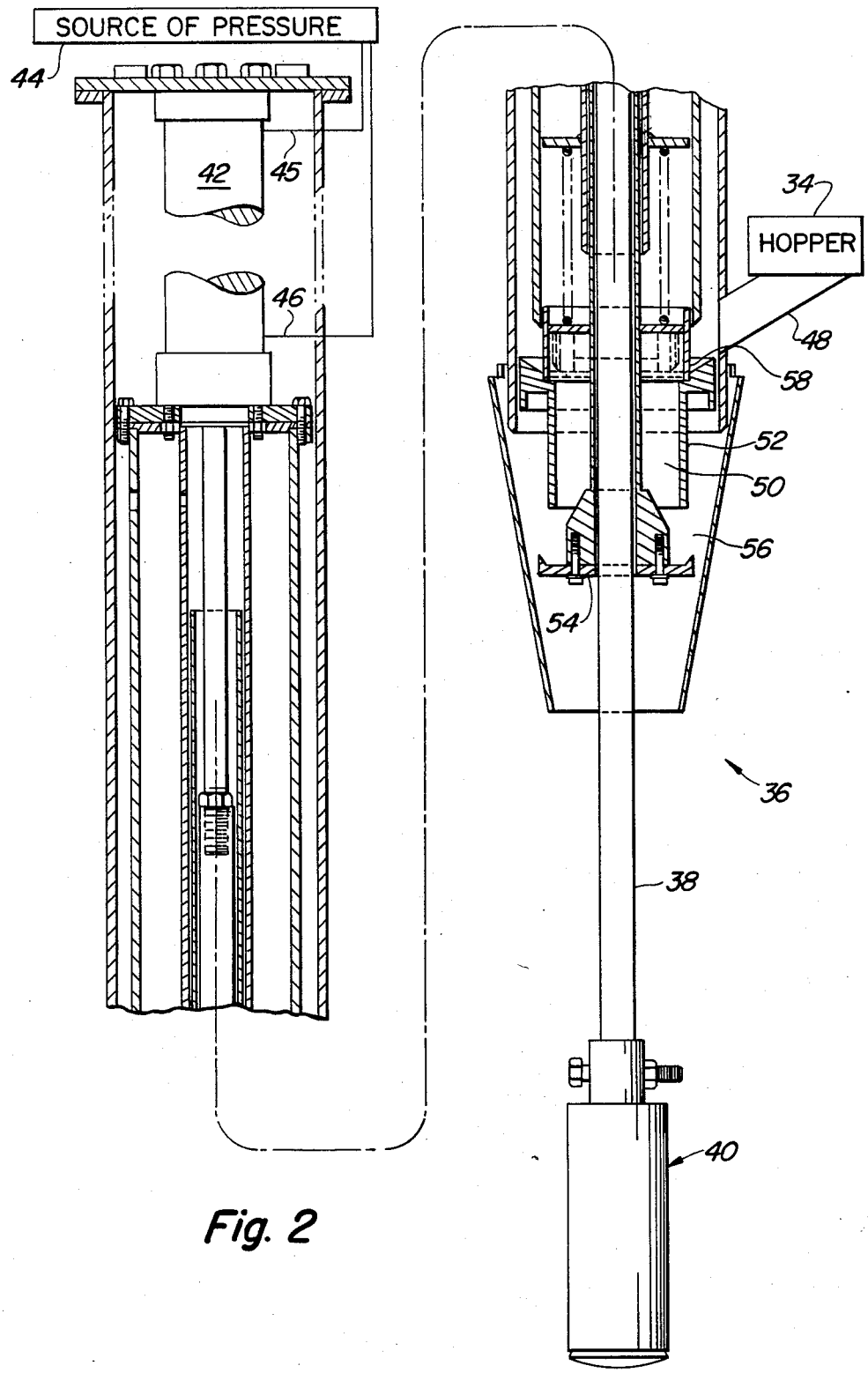
FIG. 2 is an enlarged assembly view of a non-conductive plugger foot attached to a mechanical feeder and actuating cylinder.

Referring to FIG. 2, when alumina ore is to be added to the bath 26, the steel rod 38 and plugger foot 40 are thrust downward to punch a hole through the crust 30 by actuation of a reversible, double-acting, fluid or air operated cylinder 42. The cylinder 42 is connected to a source of pressure 44 by lines 45 and 46.

Alumina ore from hopper 34 is directed to the feeder mechanism 36 through a conduit 48 and enters a volumetric cup 50 formed within a sliding valve 52. The alumina ore is retained within the volumetric cup 50 by a bottom plate 54 securely attached to the steel rod 38.

When the cylinder 42 is activated, it depresses the steel rod 38 downward causing the bottom plate 54 to move downwardly thereby forming an opening 56. The alumina ore is fed by gravity into the bath 26 through the hole punched in the crust 30 by the plugger foot 40. After the alumina ore has been dispensed from the volumetric cup 50, the cylinder 42 is again actuated to move the steel rod 38 upward such that the bottom plate 54 contacts the sliding valve 52 and closes off the opening 56. At this time, a slide valve 58, located above the sliding valve 52, opens to permit alumina ore from the hopper 34 to enter the volumetric cup 50. The amount of ore to be added each time to the pot 16 will be determined by the size of the volumetric cup 50. The frequency at which the alumina ore is added can be adjusted to coincide with the operation of the pot 16.

Figure 3:
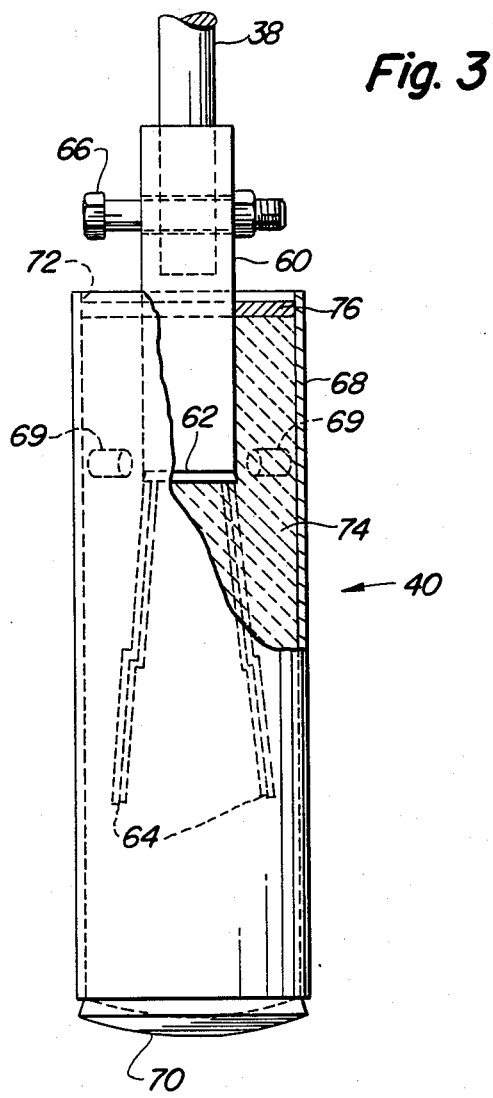
FIG. 3 is a partial cross-sectional view of a non-conductive plugger foot.

Referring to FIG. 3, a non-conductive plugger foot 40 is shown comprised of a cylindrical sleeve 60 having a closed end 62 with at least one downwardly depending leg 64 attached thereto. As shown in FIG. 3, there are two downwardly depending legs 64 which are angled outward from the closed end 62 and which have an irregular or offset arrangement. The particular configuration of the legs 64 should be such that they provide an irregular or jagged surface which enhances bonding a material thereto. The opposite end of the sleeve 60 is connected to the steel rod 38 by a fastener 66. The fastener 66 can include a bolt which passes through an aperture formed in both the steel rod 38 and the sleeve 60 and is held in place by a nut.

The non-conductive plugger foot 40 also includes a hollow cylindrical shell 68 which preferably is constructed of a hard metal material such as stainless steel. Welded to the inside of the shell 68, at approximately 75% of its vertical height, are three equally spaced pins 69 (only two of which are shown). The pins 69 provide anchors for holding a refractory material to the shell 68. The lower end of the shell 68 is closed by an end plate 70. The configuration of the end plate 70 is not critically important; however, a rounded, pointed, convex or conical configuration would be more desirable for piercing the crust 30 than would a flat surface, although a flat surface will work. The opposite end of the shell 68 is open at 72 so as to receive the sleeve 60 in such a manner that the legs 64 are completely enclosed therein. A non-conductive, heat resistant refractory material 74 is then added through the open end 72 so as to form a solid permanent bond between the sleeve 60, the legs 64 and the shell 68. The refractory material 74 must have a high compressive strength and an electrical resistance of 100,000 ohms or greater. The electrical resistance of the refractory material 74 has been placed at 100,000 ohms for this is the value which would minimize arcing that causes harm to the seals and other components of the feeder mechanism 36. It has been mathematically determined that any electrical current passing through the non-conductive plugger foot 40 having an electrical resistance of greater than 100,000 ohms will not be harmful to the feeder mechanism 36.

The refractory material 74 must be capable of withstanding temperatures of about 950° C. Experimentation has shown that an alumina base refractory material comprised of about 50–95 weight percent aluminum oxide is suitable. Preferably, the refractory material will have a composition of about 50–90 weight percent of aluminum oxide and about 10–30 weight percent of silicon oxide. A commercially available non-conductive refractory material sold under the trade name "Plicast" works well. "Plicast" is marketed by Plibrico Company of 1800 Kingsbury Street, Chicago, Ill. 60614. The chemical composition of "Plicast" is stated in the trade literature to contain 69% aluminum oxide, 24% silicon dioxide, 0.8% iron oxide, 1.3% titanium dioxide, 1.5% calcium oxide, and a trace amount of magnesium oxide and alkali metal oxides.

Ceramics having an electrical resistance of at least 100,000 ohms and capable of withstanding temperatures of about 950° C. or above can also be used as the non-conductive, refractory material.

The refractory material 74 must form a solid permanent bond between the sleeve 60, the legs 64, the shell 68 and the pins 69. For this reason, one skilled in the art will readily appreciate the significance of having the peculiarly shaped legs 64 such that they will increase the holding strength of the bond that is formed with the refractory material 74.

In addition to the above, the plugger foot 40 can contain a non-conductive coating 76 which will protect the refractory material 74 from harmful gases. Preferably, the coating 76 is an alumina-chromic oxide, phosphate bonded mortar which can prevent the passage of fluoride gases. A recommended coating is sold under the trademark "Jadeset" which is marketed by the A. P. Green Refractories Company of Mexico, Mo.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A non-conductive plugger foot for breaking through a solidified crust comprising a hollow cylindrical shell closed at one end and filled with a non-conductive refractory material.

2. A non-conductive plugger foot for breaking through a solidified crust comprising a steel shell closed at one end and filled with a non-conductive refractory material.

3. The non-conductive plugger foot of claim 2 wherein said refractory material forms a solid permanent bond with said shell and has an electrical resistance of at least 100,000 ohms.

4. The non-conductive plugger foot of claim 2 wherein said refractory material is comprised of 50–95 weight percent of aluminum oxide and is capable of withstanding temperatures of about 950° C.

5. A non-conductive plugger foot for breaking through a solidified crust of electrolyte on an electrolytic reduction cell, said plugger foot comprising a hollow shell closed at one end and connected at an opposite end to an air actuated apparatus, said shell containing an alumina based, non-conductive refractory material having an electrical resistance of at least 100,000 ohms.

6. A non-conductive plugger foot for breaking through a solidified crust of electrolyte on an electrolytic reduction cell, said plugger foot comprising:
(a) a cylindrical sleeve having at least one downwardly depending leg attached thereto, said sleeve connected at an opposite end to a vertically movable rod attached to an air actuated apparatus, and
(b) a hollow cylindrical shell closed at one end and having said sleeve inserted in an opposite end thereof such that said leg is completely enclosed therein, said shell containing a heat resistant, non-conductive refractory material which forms a permanent bond between said sleeve, leg and shell.

7. The non-conductive plugger foot of claim 6 wherein there are two downwardly depending legs which angle outwardly from said sleeve to increase the holding strength of said bond formed by said refractory material.

8. The non-conductive plugger foot of claim 6 wherein said refractory material has an electrical resistance of at least 100,000 ohms.

9. The non-conductive plugger foot of claim 8 wherein said refractory material has an alumina base and is capable of withstanding temperatures of about 950° C.

10. The non-conductive plugger foot of claim 6 wherein said refractory material is a ceramic.

11. The non-conductive plugger foot of claim 6 wherein said refractory material comprises about 50–95 weight percent of aluminum oxide.

12. The non-conductive plugger foot of claim 11 wherein said refractory material comprises about 50–90 weight percent of aluminum oxide and about 10–30 weight percent of silicon oxide.

13. A non-conductive plugger foot for breaking through a solidified crust of electrolyte on an electrolytic reduction cell, said plugger foot comprising:
    (a) a cylindrical sleeve having at least two downwardly depending legs attached thereto, said sleeve being connected at an opposite end to a vertically movable rod attached to an air actuated apparatus,
    (b) a hollow cylindrical shell closed at one end by an end plate and having said sleeve inserted in an opposite open end thereof such that said legs are completely enclosed therein, said shell containing a heat resistant, non-conductive refractory material having an electrical resistance of at least 100,000 ohms, said refractory material forming a solid bond between said sleeve, legs and shell, and
    (c) a non-conductive coating applied over said exposed refractory material adjacent to said open end of said shell to seal said refractory material from harmful gases.

14. The non-conductive plugger foot assembly of claim 13 wherein said coating is an alumina-chromic oxide, phosphate bonded mortar.

15. The non-conductive plugger foot assembly of claim 13 wherein said refractory material has an alumina base comprised of about 50–95 weight percent aluminum oxide.

16. The non-conductive plugger foot assembly of claim 15 wherein said refractory material has a high compressive strength and is capable of withstanding temperatures of about 950° C.

17. The non-conductive plugger foot assembly of claim 13 wherein said legs are angled outwardly from said closed end of said sleeve to increase the holding strength of said bond formed by said refractory material.

18. The non-conductive plugger foot assembly of claim 13 wherein said refractory material is a ceramic.

19. The non-conductive plugger foot assembly of claim 13 wherein a plurality of pins are attached to an inside surface of said shell to increase the holding strength of the bond formed by said refractory material.

* * * * *